US008264569B2

(12) United States Patent  
Kawaguchi et al.

(10) Patent No.: US 8,264,569 B2  
(45) Date of Patent: Sep. 11, 2012

(54) DATA TRANSFER APPARATUS AND DATA TRANSFER METHOD

(75) Inventors: Tsuyoshi Kawaguchi, Osaka (JP);  
Masafumi Nosaka, Osaka (JP);  
Masafumi Sato, Osaka (JP)

(73) Assignee: Panasonic Corporation, Osaka (JP)

( * ) Notice: Subject to any disclaimer, the term of this patent is extended or adjusted under 35 U.S.C. 154(b) by 322 days.

(21) Appl. No.: 12/496,169

(22) Filed: Jul. 1, 2009

(65) Prior Publication Data

US 2010/0007767 A1  Jan. 14, 2010

(30) Foreign Application Priority Data

Jul. 3, 2008  (JP) ................................ 2008-174137

(51) Int. Cl.  
*H04N 5/76* (2006.01)

(52) U.S. Cl. ............... 348/231.2; 348/231.3; 348/231.5; 348/231.8; 348/231.9

(58) Field of Classification Search ............ 348/231.99, 348/231.1, 231.2, 231.3, 231.5, 231.6, 231.7, 348/231.8, 231.9, 207.1, 207.11, 207.2; 345/537, 345/538, 555; 715/748, 769; 709/212, 213, 709/214, 215, 216  
See application file for complete search history.

(56) References Cited

U.S. PATENT DOCUMENTS

| 6,816,190 | B1 | 11/2004 | Miyazawa |
| 7,385,635 | B2 * | 6/2008 | Kobayashi et al. ...... 348/231.99 |
| 7,586,516 | B2 * | 9/2009 | Koide ........................ 348/207.1 |
| 2006/0072023 | A1 * | 4/2006 | Kurosawa et al. ............ 348/294 |
| 2007/0103553 | A1 * | 5/2007 | Hara ........................ 348/207.1 |
| 2008/0284855 | A1 * | 11/2008 | Umeyama et al. ......... 348/207.1 |

FOREIGN PATENT DOCUMENTS

JP   2001-008147 A   1/2001

* cited by examiner

*Primary Examiner* — Chieh M Fan  
*Assistant Examiner* — Peter Chon  
(74) *Attorney, Agent, or Firm* — Hamre, Schumann, Mueller & Larson, P.C.

(57) ABSTRACT

The data transfer apparatus according to the present invention includes a transfer portion that reads out image data stored in a first storage medium, and transfers the image data to a second storage medium; an identification portion that identifies image data stored in the first storage medium and image data stored in the second storage medium; a specification portion that, when transfer of image data by the transfer portion is terminated partway, determines the presence or absence of untransferred image data to the second storage medium among interrelated image data based on the identification result by the identification portion, and that, when the presence of untransferred image data is determined, specifies image data related to the untransferred image data among image data stored in the second storage medium; and a deletion portion that deletes the image data specified by the specification portion from the second storage medium.

7 Claims, 7 Drawing Sheets

DATA TRANSFER APPARATUS AND DATA TRANSFER METHOD

BACKGROUND OF THE INVENTION

1. Field of the Invention

The present invention relates to a data transfer apparatus and a data transfer method, and specifically, to a data transfer apparatus capable of transferring data between a plurality of storage media.

2. Description of Related Art

A technique of transferring data between a plurality of storage media is widely used in general. For example, JP 2001-8147A discloses an electronic camera capable of transferring image data from a memory card to a hard disk. More specifically, this electronic camera is configured to transfer all the image data recorded on the memory card to the hard disk when the remaining capacity of the memory card reaches a particular value. Thus, this electronic camera can suppress its power consumption by reducing the frequency of start/stop repetition of a rotational drive device for rotating the hard disk.

The technique of transferring image data between a plurality of storage media is used for information processing devices, such as a personal computer, other than the above electronic camera.

Further, among apparatuses capable of transferring image data, there also is an apparatus capable of terminating the transfer of image data in the course of transfer of image data, according to, for example, a user selection.

However, for example, when one or a plurality of image data are grouped to be managed under a defined rule, if transfer of image data is terminated partway, a situation can occur in which only a part of image data that already have been transferred among image data belonging to the selected group to be transferred is stored in the storage medium of the transfer destination. In this way, a user may be confused if image data belonging to the selected group to be transferred are stored partway in the transfer destination. For example, there may be a problem in which, in spite of the fact that not all image data belonging to the selected group have been stored in the storage medium of the transfer destination, the user assumes that all the image data already have been stored in the transfer destination, resulting in deletion of all the image data from the storage medium of the transfer source.

Conventional data transfer apparatuses have not focused on such a problem that can occur when transfer of image data is terminated partway, and thus no proposal has been made about the process to solve such a problem.

SUMMARY OF THE INVENTION

The purpose of the present invention is to solve the above problem, and it is an object of the present invention to provide a data transfer apparatus and a data transfer method in which, even when transfer of the selected image data is terminated partway, a user is less likely to be confused.

The present invention provides a data transfer apparatus including: a transfer portion that reads out image data stored in a first storage medium, and transfers the image data to a second storage medium; an identification portion that identifies image data stored in the first storage medium and image data stored in the second storage medium; a specification portion that, when transfer of image data by the transfer portion is terminated partway, determines the presence or absence of untransferred image data to the second storage medium among interrelated image data based on the identification result by the identification portion and that, upon determining the presence of untransferred image data, specifies image data related to the untransferred image data among the image data stored in the second storage medium; and a deletion portion that deletes the image data specified by the specification portion from the second storage medium.

The present invention further provides a data transfer method of transferring image data stored in a first storage medium to a second storage medium, including the steps of in the case where transfer of image data is terminated in the course of reading out the image data stored in the first storage medium and transferring it to the second storage medium, after determining the presence or absence of untransferred image data to the second storage medium among interrelated image data, specifying image data related to the untransferred image data among the image data stored in the second storage medium when determining the presence of untransferred image data; and deleting the image data specified as image data related to the untransferred image data from the second storage medium.

According to the data transfer apparatus and the data transfer method of the present invention, even when transfer of image data is terminated before transfer of image data from the first storage medium to the second storage medium is completed, resulting in the presence of untransferred image data among interrelated image data, image data related to the untransferred image data do not remain in the storage medium of the transfer destination. In other words, the untransferred image data and the image data related to the untransferred image data are treated collectively as untransferred image data that have not been transferred completely. Accordingly, the possibility decreases in which, in spite of the fact that not all interrelated image data have been transferred, a user misunderstands all the interrelated image data have been transferred. Thus, according to the data transfer apparatus and the data transfer method of the present invention, even when transfer of the selected image data is terminated partway, a user is less likely to be confused.

DETAILED DESCRIPTION OF THE INVENTION

Embodiment 1

Hereinafter, a digital video camera as an embodiment of the data transfer apparatus of the present invention will be described with reference to the drawings. It should be noted that the following embodiments are to be considered as an example, and the present invention is not limited thereto.

1-1. Overview

Figure 1:
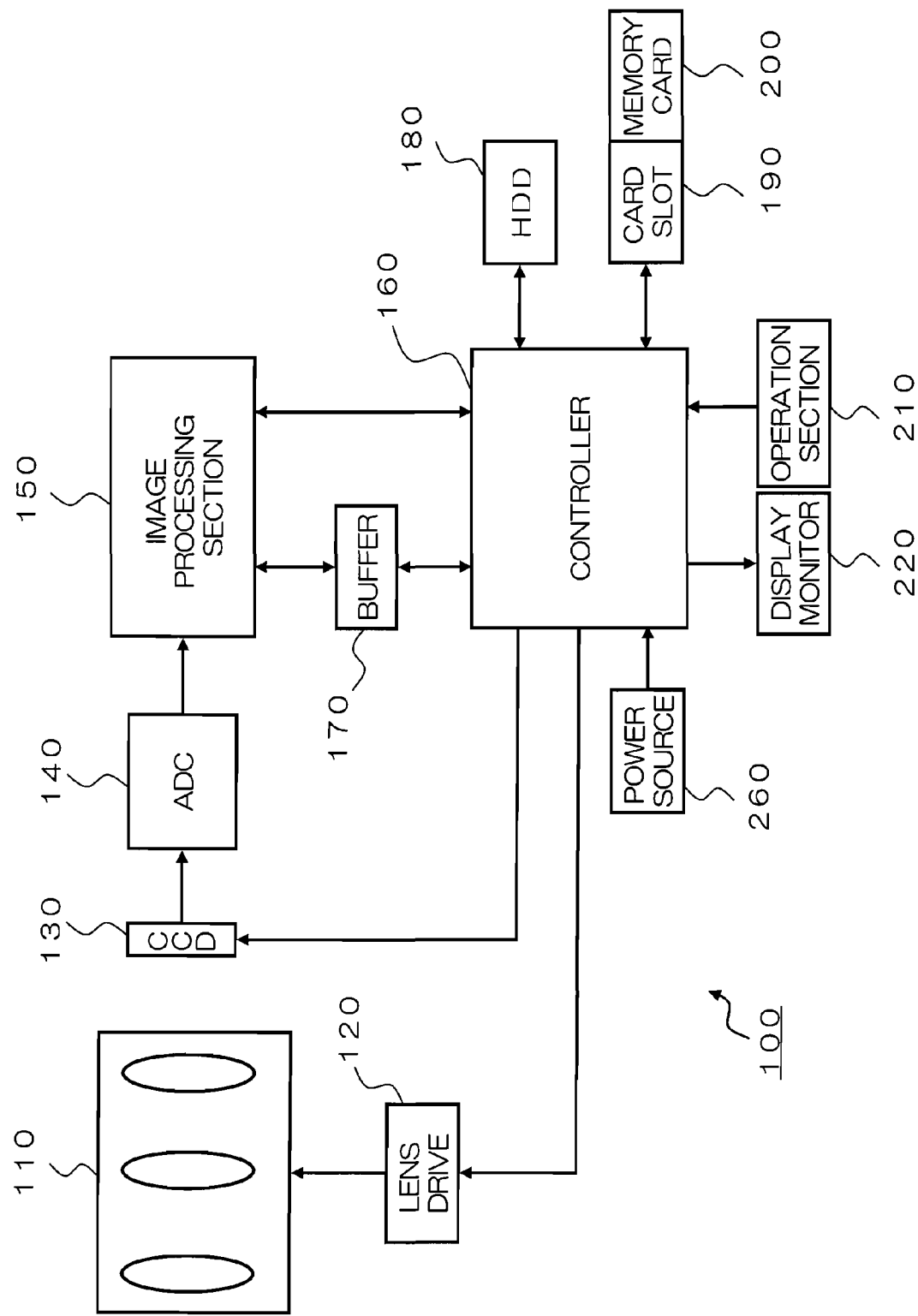
FIG. 1 is a block diagram indicating a structure of a digital video camera as an embodiment of the data transfer apparatus of the present invention.

As shown in FIG. 1, a digital video camera 100 according to this embodiment is equipped with a hard disk drive (hereinafter, abbreviated to a HDD) 180, and a card slot 190 into which a memory card 200 is inserted. The digital video camera 100 can transfer image data stored in the HDD 180 to the memory card 200 inserted into the card slot 190. Further, the digital video camera 100 can transfer image data stored in the memory card 200 to the HDD 180. That is, in this embodiment, either one of the HDD 180 and the memory card 200 corresponds to the first storage medium, while the other one corresponds to the second storage medium, in the data transfer apparatus and data transfer method of the present invention.

The digital video camera 100 is an example of the data transfer apparatus that can transfer image data between a plurality of storage media (the HDD 180, and memory card 200), as described above. In the digital video camera 100, even when transfer of image data is terminated partway, data transfer is possible in which the image data can be divided at an appropriate point, that is, interrelated image data can be transferred as a collective data group. Thus, the possibility of a user misunderstanding that all interrelated image data have been transferred in spite of the fact that not all the interrelated image data have been transferred disappears, in the case where data transfer is terminated in the course of transfer of image data.

1-2. Structure

A structure of the digital video camera 100 according to this embodiment is described below referring to FIG. 1. FIG. 1 is a block diagram indicating a structure of the digital video camera 100.

The digital video camera 100 is equipped with an optical system 110, a CCD image sensor 130, an A/D converter 140 and an image processing section 150 to generate image data of an object, a controller 160 to control the entire apparatus, an HDD 180 as a first storage medium or a second storage medium, a card slot 190 into which a memory card 200 as a first storage medium or a second storage medium is inserted, a power source 260 to supply power to the entire apparatus, an operation section 210 for various input operations, and a display monitor 220 for various displays. Further, there are provided, respectively, a lens drive 120 between the controller 160 and the optical system 110, and a buffer 170 between the controller 160 and the image processing section 150.

In the digital video camera 100, an object image formed by the optical system 110 that is constituted by one or a plurality of lenses is picked up by the CCD image sensor 130. The image data generated by the CCD image sensor 130 is subjected to various processes in the image processing section 150, and stored in the HDD 180 or the removable memory card 200. Further, the digital video camera 100 can transfer image data stored in the HDD 180 to the memory card 200. The digital video camera 100 can transfer image data stored in the memory card 200 to the HDD 180 as well. Hereinafter, the structure of the digital video camera 100 will be described in detail.

The optical system 110 is constituted by a zoom lens and a focus lens. An object image can be enlarged or reduced by shifting a zoom lens along the optical axis. Further, the focus of an object image can be adjusted by shifting a focus lens along the optical axis.

The lens drive 120 drives various lenses included in the optical system 110. Examples thereof include a zoom motor that drives the zoom lens, and a focus motor that drives the focus lens.

The CCD image sensor 130 generates image data by picking up an object image formed by the optical system 110. The CCD image sensor 130 performs various operations, such as exposure, transfer, and electronic shutter.

The A/D converter 140 converts analog image data generated by the CCD image sensor 130 into digital image data.

The image processing section 150 performs various processes on the image data generated by the CCD image sensor 130. Specifically, the image processing section 150 manipulates the image data generated by the CCD image sensor 130, so as to generate image data to be displayed on the display monitor 220, or image data to be stored in the HDD 180 or the memory card 200. For example, the image processing section 150 performs various processes on the image data generated by the CCD image sensor 130, such as gamma correction, white balance correction, and defect correction. Also, the image processing section 150 compresses the image data generated by the CCD image sensor 130 by using, for example, a compression format defined in the MPEG-4/AVC standard. The image processing section 150 can be achieved by employing a DSP (Digital Signal Processor), a microcomputer or the like.

The controller 160 is a control portion that controls the entire apparatus. The controller 160 can be achieved by employing a semiconductor element or the like. The controller 160 may be constituted only by hardware, or may be constituted by hardware and software in combination, to be achieved. The controller 160 can be achieved by employing a microcomputer or the like.

The buffer 170 functions as working memory of the image processing section 150 and the controller 160. The buffer 170 can be achieved by employing, for example, a DRAM (Dynamic Random Access Memory), a ferroelectric memory or the like.

The HDD 180 can store the image data generated by the image processing section 150. The card slot 190 can removably receive the memory card 200. The card slot 190 can connect with the memory card 200 mechanically and electrically. The memory card 200 internally include a flash memory, a ferroelectric memory or the like, so as to be capable of storing the image data generated by the image processing section 150. The controller 160 can read out image data from the HDD 180, and transfer the read image data to the memory card 200. Also, the controller 160 can read out image data from the memory card 200, and transfer the read image data to the HDD 180.

The operation section 210 is a generic name for a user interface that receives operations from a user. Example thereof include arrow keys and the decision button that receive operations from a user. The detailed description will follow later, but the operation section 210 includes functions as an identification information receiving portion that receives a user selection concerning identification information associated with image data to be transferred between the HDD 180 and the memory card 200, and a transfer termination receiving portion that receives a user selection concerning termination of image data transfer. A part of the operation section 210 may be constituted by a touch screen using the display monitor 220.

The display monitor 220 can display an image representing the image data generated by the CCD image sensor 130, or an image representing the image data read out from the HDD 180 or the memory card 200. Further, the display monitor 220 can display various setting information of the digital video camera 100, or a guide screen for the various settings. As the display monitor 220, a liquid crystal monitor, an electronic viewfinder, an organic EL monitor, or the like can be employed.

The power source 260 supplies power to the overall digital video camera 100. The power source 260 can be achieved by employing, for example, a lithium-ion battery, an alkaline dry cell battery or an AC adapter.

Figure 2:
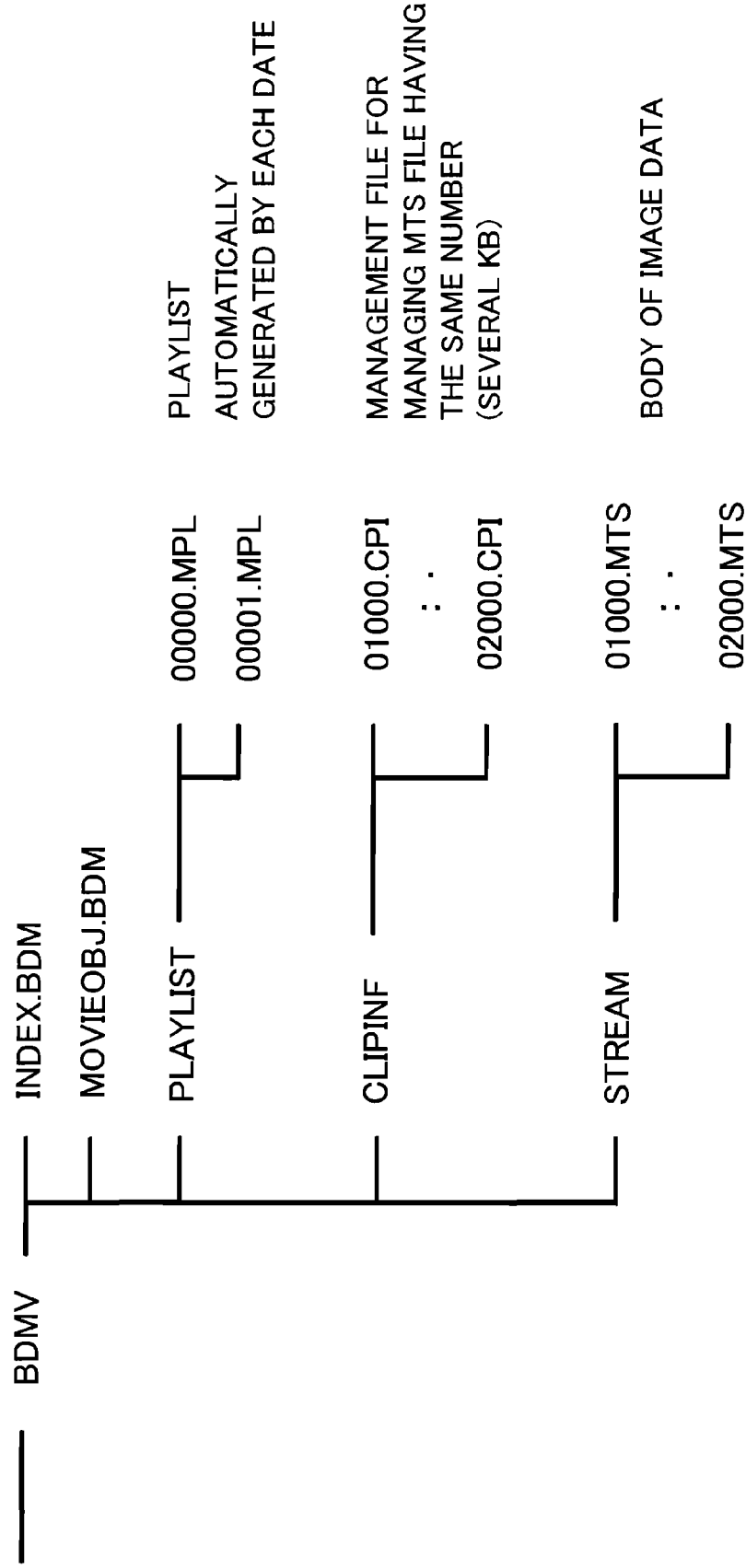
FIG. 2 is a schematic view indicating files stored in a storage medium in a digital video camera and a file directory structure as an embodiment of the data transfer apparatus of the present invention.
Figure 3:
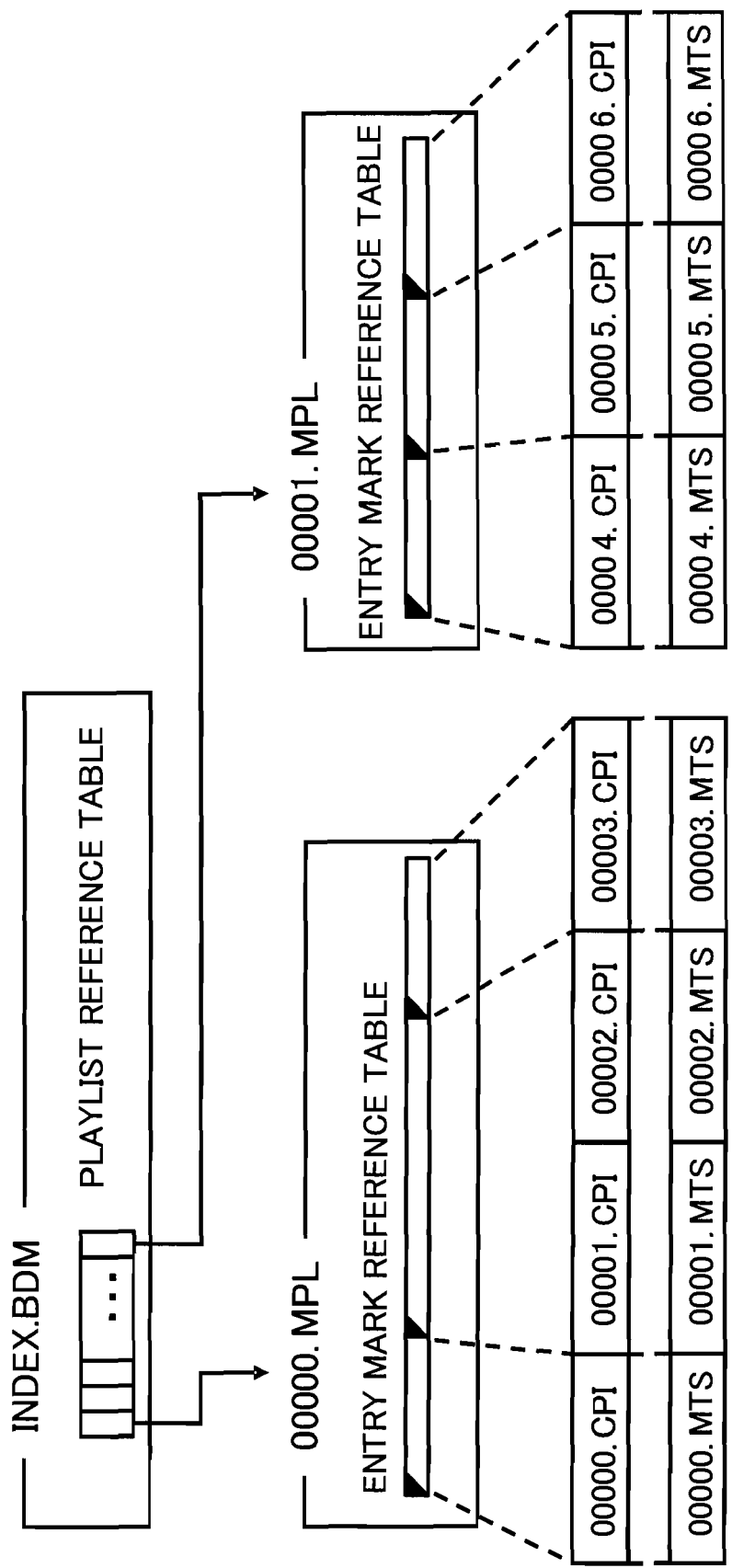
FIG. 3 is a schematic view indicating each relationship between files stored in a storage medium in a digital video camera as an embodiment of the data transfer apparatus of the present invention.

Each relationship between the movie files (image data) stored in the HDD 180 and the memory card 200 is described below, referring to FIG. 2 and FIG. 3. FIG. 2 is a schematic view for describing each directory structure of files in the HDD 180 and memory card 200. FIG. 3 is a schematic view for describing the relationship between files described in FIG. 2.

First, the directory structure of the HDD 180 and the memory card 200 is described with reference to FIG. 2. Since the digital video camera 100 is compliant with the AVCHD (Advanced Video Codec High Definition™) standard, the HDD 180 and the memory card 200 each have a directory structure as shown in FIG. 2. The AVCHD standard is a format for recording high-definition video.

The HDD 180 and the memory card 200 each store "INDEX.BDM", "MOVIEOBJ.BDM", "PLAYLIST", "CLIPINF", and "STREAM" in "BDMV" directory.

"INDEX.BDM" herein is a management file that manages the type of files stored in the storage medium (which is, in this embodiment, the HDD 180 and the memory card 200).

"MOVIEOBJ.BDM" is a file that defines a reproduction method for the stored movie files.

"PLAYLIST" stores playlists having the file extension, "MPL". The playlist herein is a management file that groups one or a plurality of movie files based on a defined rule, and manages them. For example, in the digital video camera 100, a playlist collectively manages all movie files having the same shooting date. In this regard, the playlist includes, as identification information, information on the shooting date (shooting date information) of the movie files that the playlist itself manages. The controller 160 can identify the shooting date of the movie files by referring to the playlist by which the movie files are managed. The controller 160 uses information on the shooting date as identification information, and thereby can identify image data stored in the HDD 180 and image data stored in the memory card 200.

"CLIPINF" stores management files having the file extension, "CPI" (hereinafter, referred to as CPI files). The management files having the file extension "CPI" are in one-to-one correspondence with movie files having the file extension, "MTS". The management file with the file extension, "CPI", has information on the corresponding movie file (for example, information on the angle of view of moving images, information on the type of audio data in the movie file, or the like).

"STREAM" stores movie files having the extension, "MTS" (hereinafter, referred to as MTS files), each of which being the body of image data.

Next, each relationship between the above described directories and files is described with reference to FIG. 3.

"INDEX.BDM" manages playlists recorded on a storage medium. The playlist with the file extension, "MPL", has a reference table for managing CPI files. CPI files and MTS files are in one-to-one correspondence.

As described above, the HDD 180 and the memory card 200 in this embodiment are configured to be capable of storing image data associated with shooting date information that is identification information, and they classify and store the image data based on the associated shooting date information.

1-3. Transfer Operation

Figure 4:
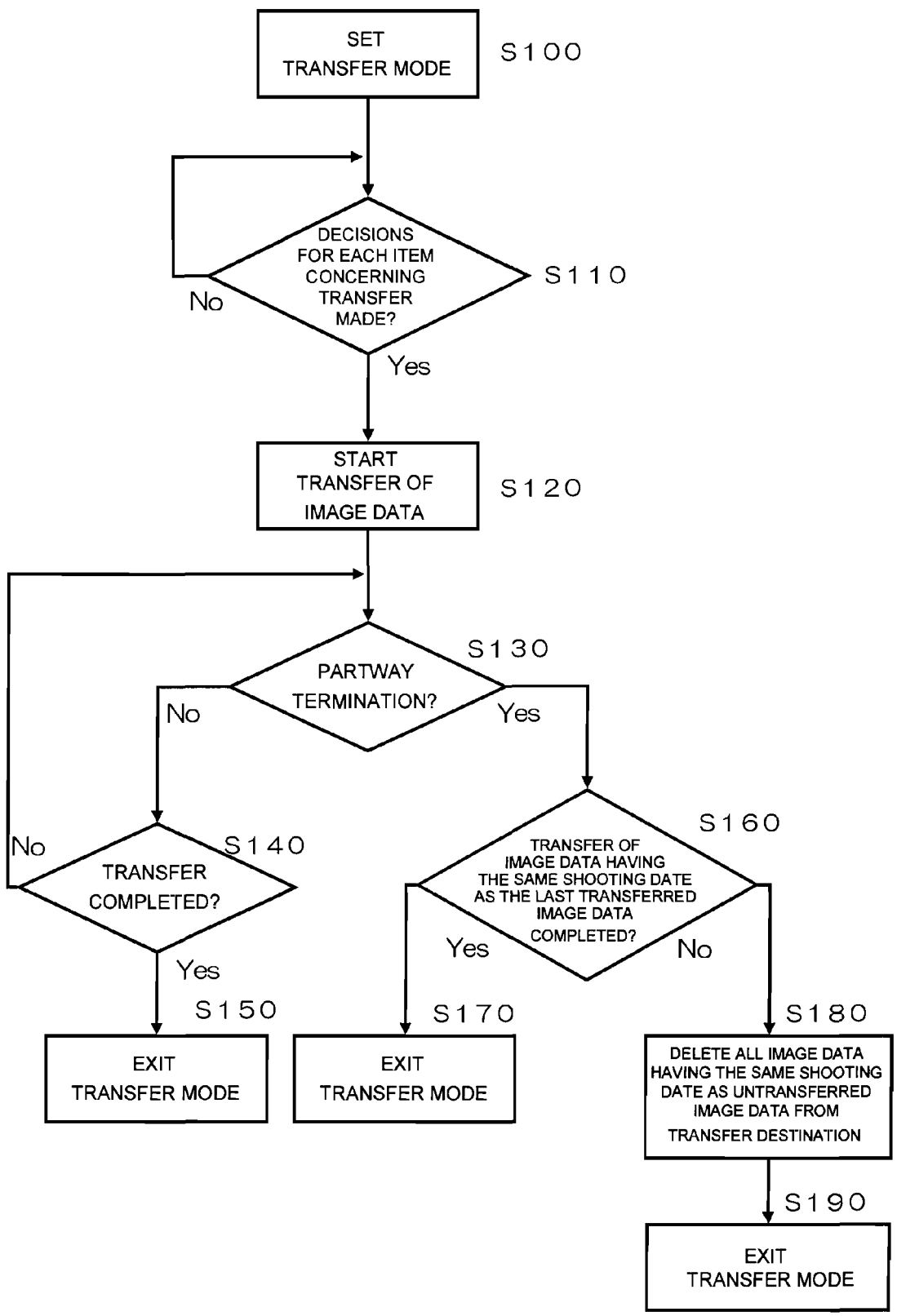
FIG. 4 is a flowchart indicating an example of a transfer process of image data in a digital video camera as an embodiment of the data transfer apparatus of the present invention.

An example of transfer operation of image data in the digital video camera 100 is described with reference to FIG. 4. FIG. 4 is a flowchart for describing transfer operation of image data in the digital video camera 100.

A user can set the digital video camera 100 to a transfer mode by operating the operation section 210 (S100).

Figure 5:
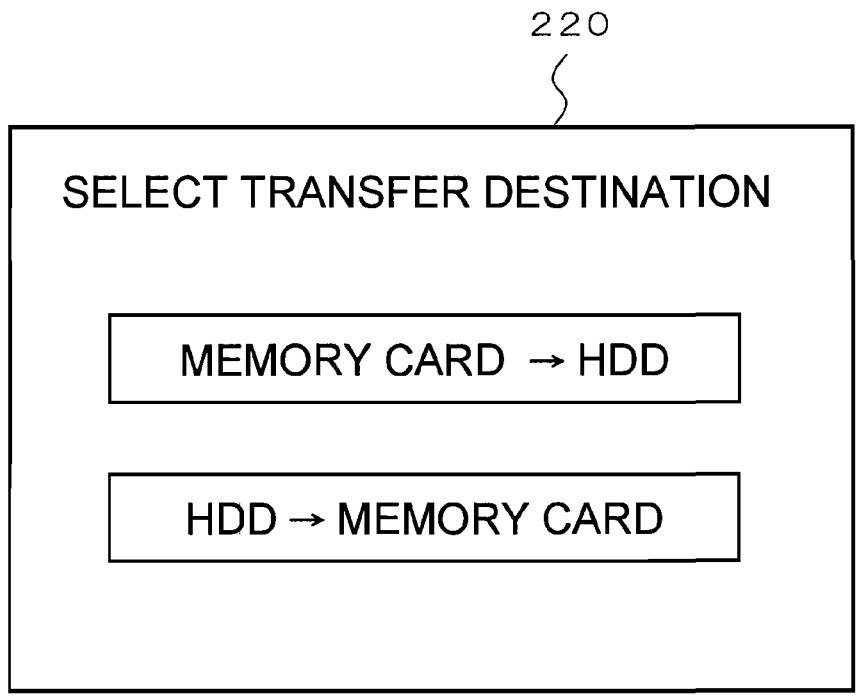
FIG. 5 is a schematic view indicating a display example of a display monitor in a digital video camera as an embodiment of the data transfer apparatus of the present invention.

When the transfer mode is set, the controller 160 stands by until various decisions are made by the user (S110). Such various decisions should include at least three decision items. The first decision item is a decision about whether to transfer image data from the HDD 180 to the memory card 200, or transfer it from the memory card 200 to the HDD 180. The display monitor 220 displays a screen, for example, as shown in FIG. 5. In this example, an operation is described in the case of transferring image data from the memory card 200 to the HDD 180, that is, in the case where the memory card 200 corresponds to the first storage medium, and the HDD 180 corresponds to the second storage medium.

Figure 6:
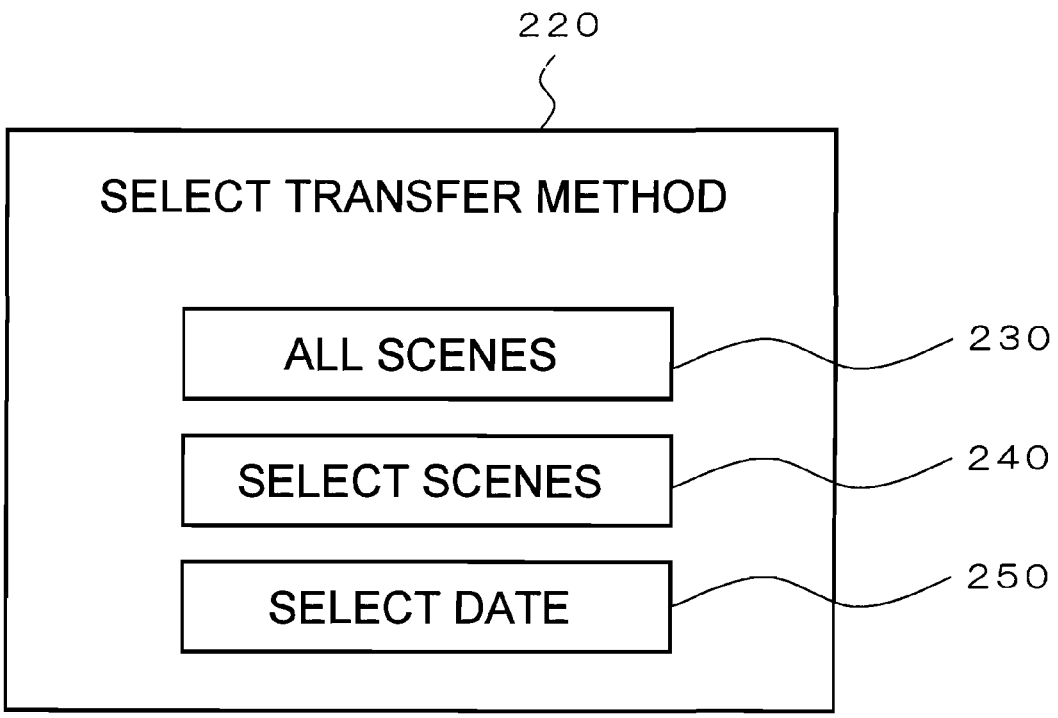
FIG. 6 is a schematic view indicating another display example of a display monitor in a digital video camera as an embodiment of the data transfer apparatus of the present invention.

The second decision item is a decision about which image data to transfer among image data stored in the transfer source, that is, a decision about which image data to transfer among image data stored in the memory card 200 herein. The display monitor 220 displays a screen, for example, as shown in FIG. 6. Upon selection of "ALL SCENES" indicated by the menu button 230, the controller 160 transfers all image data stored in the memory card 200 to the HDD 180. When selecting "SELECT SCENES" indicated by the menu button 240, a user can select one or a plurality of arbitrary image data among image data stored in the memory card 200. After selection of arbitrary image data, the controller 160 transfers all the selected image data to the HDD 180. When selecting "SELECT DATE" indicated by the menu button 250, a user can select one or an arbitrary number of shooting dates (shooting date information (identification information)) each associated with image data stored in the memory card 200. After selection of shooting dates, the controller 160 transfers all the image data having any one of the selected shooting dates to the HDD 180.

As described above, a part of the operation section 210 in the digital video camera 100 is constituted by a touch screen using the display monitor 220. The touch screen serves as the identification information receiving portion that receives a user selection of identification information associated with image data to be transferred between the HDD 180 and the memory card 200.

The third decision item is a decision for starting transfer.

Figure 7:
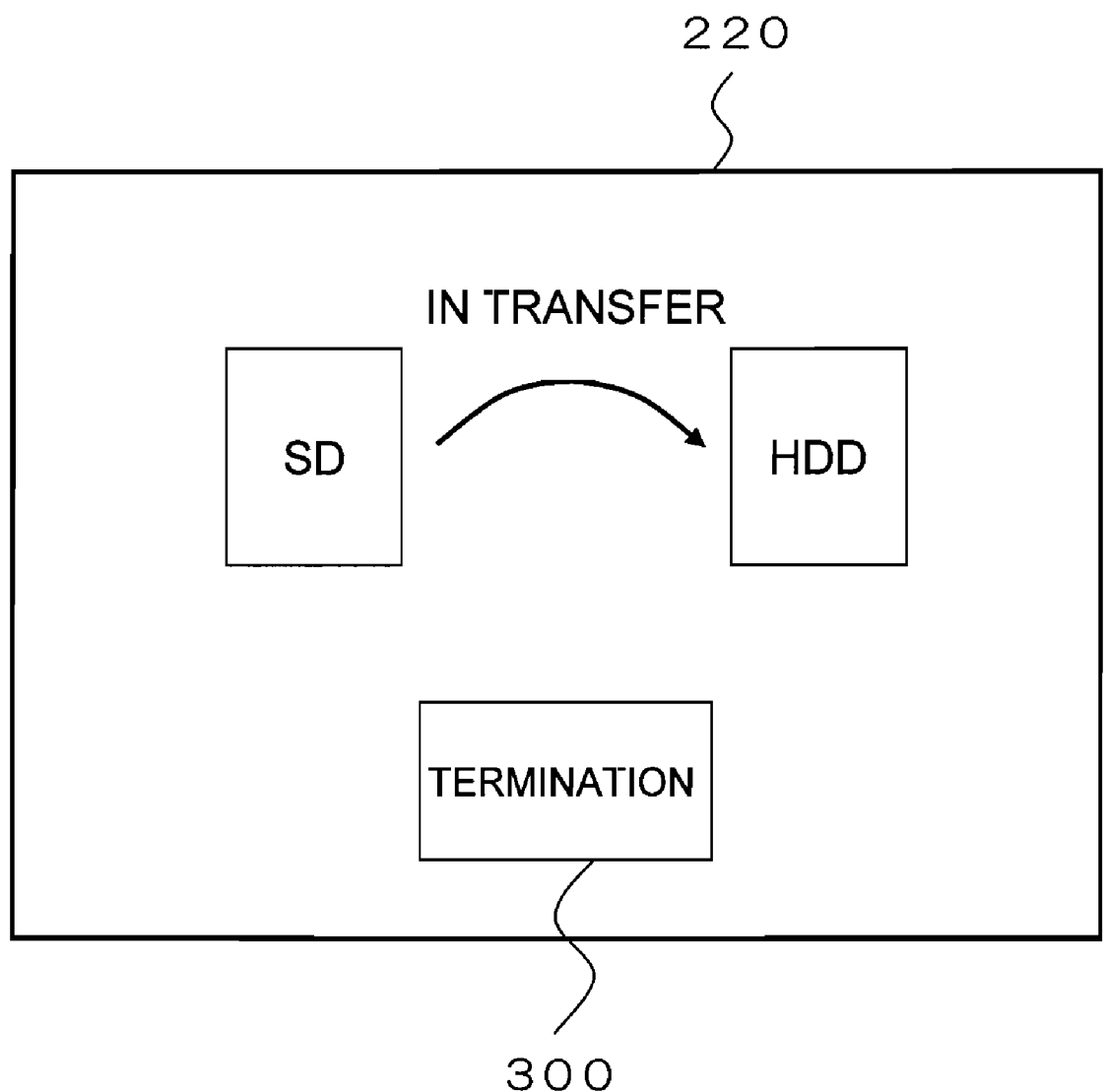
FIG. 7 is a schematic view indicating still another display example of a display monitor in a digital video camera as an embodiment of the data transfer apparatus of the present invention.

Once various decisions are made, the controller 160 starts transfer of image data (S120). Thus, the controller 160 functions as a transfer portion. When transfer of image data is started, the controller 160 determines whether or not a user has selected termination of image data transfer (S130). The display monitor 220 displays a screen as shown in FIG. 7 during transfer of image data. The user can terminate transfer of image data by selecting the menu button 300 to make a decision. In this way, a touch screen using the display monitor 220 serves as the transfer termination receiving portion that receives a user selection of termination of image data transfer.

In this embodiment, when a user selects termination of image data transfer by selecting the menu button 300 ("TERMINATION" button), the process directly proceeds, but not restrictedly, to a transfer termination process. Alternatively, a confirmation screen may be displayed on the display monitor 220 for confirmation of selection of "TERMINATION" to the user, after the user selects "TERMINATION" button. In this regard, for example, "DECISION" button and "RESTART" button may be displayed on the confirmation screen, and the subsequent process may be performed with the procedure in which, when the user selects "DECISION" button, the process directly proceeds to the transfer termination process, or when the user selects "RESTART" button, the transfer operation once stopped is started again. Note that, in the present invention, the term "termination of image data transfer" portion transfer of image data is aborted partway, however, the procedure up to the decision of "TERMINATION" is not specifically limited. For example, when "TERMINATION" is selected thereby allowing transfer of image data to be once stopped, followed by: "RESTART" of the data transfer, once again selection of "TERMINATION", and finally selection of "DECISION" of termination, or when the user selects "TERMINATION", so that the process directly proceeds to the transfer termination process, whichever the case may be, when eventually transfer of image data is aborted partway, all the cases are included in the "termination of image data transfer".

The controller 160 constantly checks whether or not termination of image data transfer occurs, and when determining that transfer of image data is not terminated partway, it determines then whether or not transfer of all the selected image data is completed (S140). The controller 160 exits the transfer mode upon determining the completion of transfer (S150). On the other hand, when determining that transfer of all the selected image data has not been completed, the controller 160 continues transfer of image data.

Further, upon determining termination of image data transfer, the controller 160 specifies image data to be deleted from the HDD 180 by using an identification result obtained by identifying image data stored in the memory card 200 and image data that already have been transferred to and stored in the HDD 180.

Specifically, the controller 160 determines the presence or absence of untransferred image data that have not been completely transferred to the HDD 180, among image data having the same shooting date as the last image data transferred to the HDD 180 (S160). As a practical process, the controller 160 first identifies the shooting date information associated with the last image data transferred to the HDD 180. Then, the controller 160 identifies image data having the same shooting date information as the identified shooting date information, that is, image data having the same shooting date as the last transferred image data, among image data stored in the HDD 180 and the memory card 200. When image data stored in the memory card 200, but not stored in the HDD 180, are present among image data having the same shooting date as the last transferred image data, the controller 160 determines the presence of image data that have not been transferred (untransferred image data) among interrelated image data having the same shooting date as the identified shooting date. By such a procedure, the controller 160 determines the presence or absence of untransferred image data that have not been completely transferred, among (interrelated) image data having the same shooting date. It should be noted that, in this embodiment, the presence of untransferred image data is determined by using the shooting date information of the last image data transferred to the HDD 180. Accordingly, in this embodiment, image data having the same shooting date information as untransferred image data are equivalent to image data having the same shooting date as the last image data transferred to the HDD 180.

When the absence of untransferred image data among image data having the same shooting date as the last transferred image data is determined, the controller 160 exits the transfer mode (S170).

In contrast, when the presence of untransferred image data among image data having the same shooting date as the last transferred image data is determined, the controller 160 specifies, as image data related to the untransferred image data, image data having the same shooting date as the last image data transferred to the HDD 180, that is, image data having the same shooting date information as the untransferred image data. In this way, the controller 160 functions as an identification portion that identifies image data stored in the first storage medium that is a transfer source and image data stored in the second storage medium that is a transfer destination. Further, the controller 160 determines the presence or absence of untransferred image data to the second storage medium among interrelated image data. When the presence of untransferred image data is determined, it specifies image data related to the untransferred image data among image data stored in the second storage medium so as to function also as a specification portion.

The controller 160 deletes, from the HDD 180, all the specified image data (S180). At this time, the controller 160 functions also as a deletion portion in the present invention. Specifically, it deletes the playlist, CPI files, and MTS files in which the last image data transferred to the HDD 180 is stored. Accordingly, all image data having the same shooting date information as the untransferred image data can be deleted from the HDD 180. In this regard, deletion of the image data may be performed by using a method in which information on image data to be deleted is erased from the HDD 180 physically completely, or using a method in which the image data is erased logically in the HDD 180 by opening the address where the information on the image data to be deleted is stored, so that the address can be overwritten. Upon deleting all the image data having the same shooting date information as the untransferred image data from the HDD 180, the controller 160 exits the transfer mode (S190).

Thus, the digital video camera 100 according to this embodiment is configured to delete, from the storage medium of the transfer destination, all or a part of the already transferred image data depending on the shooting date of the last transferred image data, in other words, the shooting date of untransferred image data, when transfer of image data is terminated before the transfer of image data is completed. Accordingly, for example, when all image data ("ALL SCENES") in the storage medium of the transfer source are selected to be transferred to the storage medium of the transfer destination, and when the data transfer is terminated partway, image data having the same shooting date information as untransferred image data among image data already stored in the storage medium of the transfer destination are deleted. In this case, all image data having a shooting date prior to the shooting date of the untransferred image data are stored collectively in the storage medium of the transfer destination. Therefore, there is no situation in which only a part of image data having the same shooting date remains in the storage medium of the transfer destination partway.

Further, in the digital video camera 100 according to this embodiment, selection of image data to be transferred can be performed with "DATE SELECT". The digital video camera 100 is configured to delete, from the storage medium of the transfer destination, all or a part of the already transferred image data depending on the shooting date of the last transferred image data, in other words, the shooting date of untransferred image data, in the case where the selection is performed with "DATE SELECT" and transfer of image data is terminated before transfer of image data having the selected shooting date is completed. Due to this, when trying to transfer a plurality of image data having the same shooting date from the storage medium in which the image data are stored, even if the transfer is terminated partway, the situation can be prevented in which only a part of image data having the same shooting date is transferred to and stored in the storage medium of the transfer destination partway. As a result, the situation can be prevented in which, in spite of the fact that a user has selected image data to be transferred with "DATE SELECT", only a part of image data having a particular shooting date among the selected shooting dates is transferred, and the remaining image data is untransferred. Further, the situation also can be prevented in which only the management files are transferred to the transfer destination, and the associated image data are not transferred to the transfer destination.

Moreover, the digital video camera 100 according to this embodiment collectively manages, as one playlist, image data having the same shooting date. This allows easy deletion of all image data having the same shooting date because, in the case of deleting all image data having the same shooting date from the storage medium of the transfer destination, all the image data listed in the playlist where the image data is stored can be deleted.

1-4. Conclusion of Embodiment 1

The controller 160 provided in the digital video camera 100 according to this embodiment functions as: a transfer portion that reads out image data stored in the memory card 200 (or the HDD 180), and transfers the image data to the HDD 180 (or the memory card 200); an identification portion that identifies image data stored in the memory card 200 and image data stored in the HDD 180; a specification portion that, when transfer of image data by the transfer portion is terminated partway, determines the presence or absence of untransferred image data to the HDD 180 (or the memory card 200) that is the storage medium of the transfer destination among interrelated image data, based on the identification result by the identification portion, and that, when the presence of untransferred image data is determined, specifies image data related to the untransferred image data among image data stored in the HDD 180 (or the memory card 200) that is the storage medium of the transfer destination; and a deletion portion that deletes the image data specified by the specification portion from the HDD 180 (or the memory card 200) that is the storage medium of the transfer destination.

This allows a series of and interrelated image data to be transferred to the storage medium of the transfer destination as a whole, even when transfer of the image data is terminated partway. In addition, this can prevent the situation in which only a part of a series of and interrelated image data selected to be transferred remains in the storage medium of the transfer destination.

Embodiment 2

Hereinafter, a digital video camera as another embodiment of the data transfer apparatus of the present invention will be described with reference to the drawings. Here, the digital video camera of this embodiment has the same configuration and operation as the digital video camera of Embodiment 1, excepting that the transfer operation thereof is different from that of the digital video camera of Embodiment 1. Accordingly, description is given below only about the transfer operation of the digital video camera of this embodiment. Since the configuration of the digital video camera of this embodiment is the same as that of Embodiment 1, the transfer operation is described with reference to FIG. 1.

2-1. Transfer Operation

Figure 8:
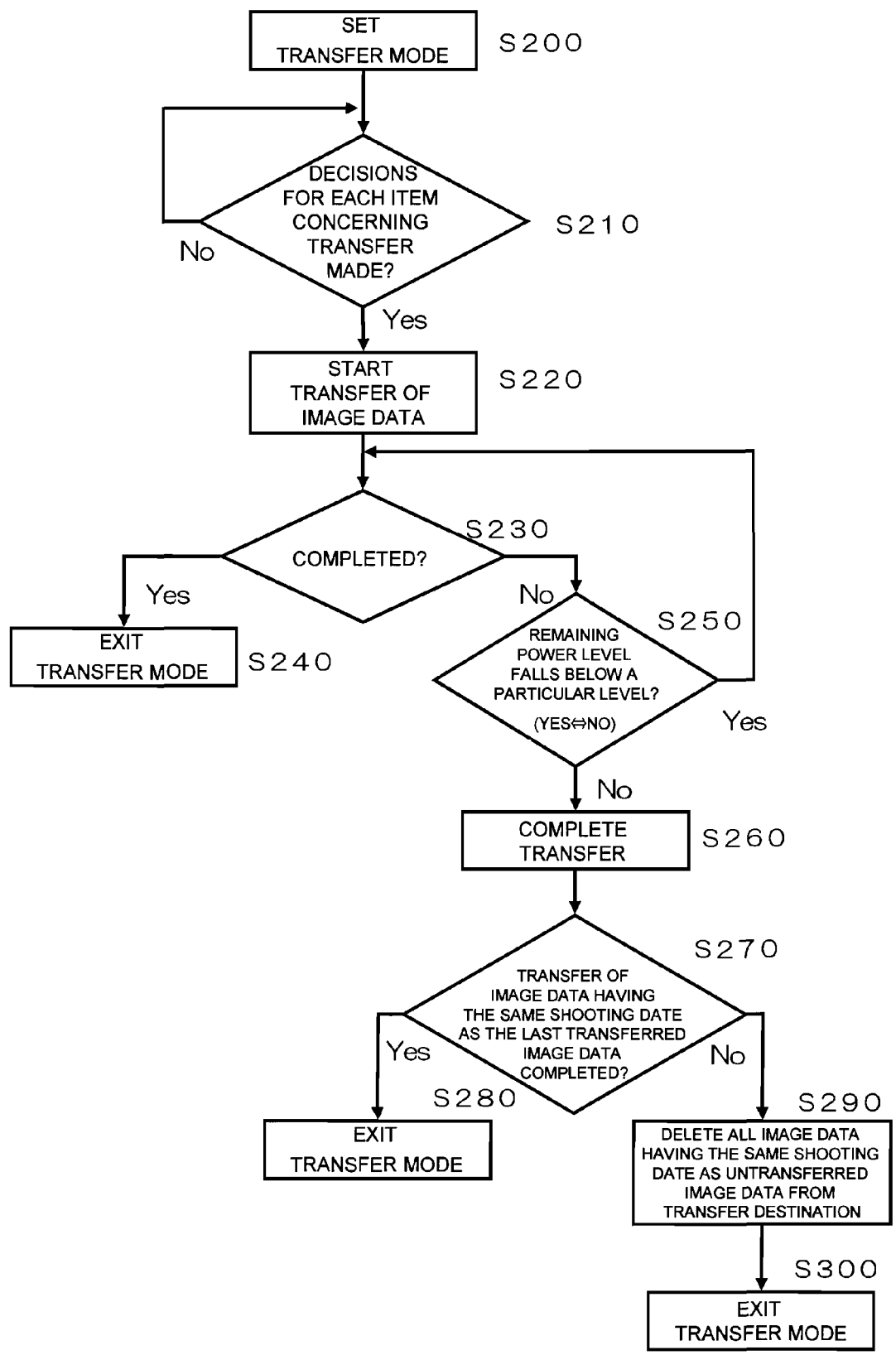
FIG. 8 is a flowchart indicating another example of a transfer process of image data in a digital video camera as an embodiment of the data transfer apparatus of the present invention.

An example of transfer operation of image data in the digital video camera 100 will be described with reference to FIG. 8. FIG. 8 is a flowchart for describing the transfer operation of image data in the digital video camera 100.

A user can set the digital video camera 100 to a transfer mode by operating the operation section 210 (S200).

When the transfer mode is set, the controller 160 stands by until various decisions are made by the user (S210). Since such various decisions are the same as those in the case of the digital video camera of Embodiment 1 (the same as the step S110, see FIG. 4), the description is omitted herein. In this example, an operation is described in the case of transferring image data from the memory card 200 to the HDD 180, that is, the case where the memory card 200 corresponds to the first storage medium, and the HDD 180 corresponds to the second storage medium, in the same manner as Example 1.

Once various decisions are made, the controller 160 starts transfer of image data (S220). In this way, the controller 160 functions as a transfer portion. When transfer of image data is started, the controller 160 determines whether or not transfer of the selected image data is thoroughly completed (S230).

When determining the thorough completion, the controller 160 exits the transfer mode (S240). In contrast, when determining that the transfer has not been thoroughly completed, the controller 160 determines whether or not the remaining power level of the power source 260 falls below a particular level (S250).

Upon determining that the remaining power level of the power source 260 is the particular level or more, the controller 160 continues transfer of image data.

On the other hand, when it determines the remaining power level of the power source 260 is less than the particular level, the controller 160 terminates transfer of image data (S260). In this way, the controller 160 functions also as an termination instruction portion that instructs the transfer portion to terminate transfer of image data.

Once transfer of image data is terminated partway, the controller 160 specifies the image data to be deleted from the HDD 180 by using an identification result obtained by identifying image data stored in the memory card 200 and image data that already have been transferred to and stored in the HDD 180.

Specifically, the controller 160 determines the presence or absence of untransferred image data that have not been completely transferred to the HDD 180 among image data having the same shooting date as the last image data transferred to the HDD 180 (S270). As a practical process, the controller 160 first identifies the shooting date information associated with the last image data transferred to the HDD 180. Then, the controller 160 identifies image data having the same shooting date information as the identified shooting date information, namely, image data having the same shooting date as the last transferred image data among image data stored in the HDD 180 and the memory card 200. In the case in which image data stored in the memory card 200, but not stored in the HDD 180, are present among image data having the same shooting date as the last transferred image data, the controller 160 determines the presence of image data that have not been transferred yet (untransferred image data) among interrelated image data having the same shooting date as the identified shooting date. The controller 160 determines the presence or absence of untransferred image data that have not been transferred completely in the (interrelated) image data having the same shooting date information by these procedures. In this embodiment, the presence of untransferred image data is determined by using the shooting date information of the last image data transferred to the HDD 180. Accordingly, in this embodiment, image data having the same shooting date information as untransferred image data is equivalent to image data having the same shooting date as the last image data transferred to the HDD 180.

When determining the absence of untransferred image data among image data having the same shooting date as the last transferred image data, the controller 160 exits the transfer mode (S280).

In contrast, when the presence of untransferred image data among image data having the same shooting date as the last transferred image data is determined, the controller 160 specifies, as image data related to the untransferred image data, image data having the same shooting date as the last image data transferred to the HDD 180, that is, image data having the same shooting date information as the untransferred image data. Thus, the controller 160 functions as an identification portion that identifies image data stored in the first storage medium that is the transfer source and image data stored in the second storage medium that is the transfer destination. Further, the controller 160 determines the presence or absence of untransferred image data to the second storage medium among interrelated image data. When the presence of untransferred image data is determined, it specifies image data related to the untransferred image data among image data stored in the second storage medium, so as to function also as a specification portion.

The controller 160 deletes all the specified image data from the HDD 180 (S290). At this time, the controller 160 functions as a deletion portion in the present invention. Specifically, it deletes the playlist, CPI files, and MTS files in which the last image data transferred to the HDD 180 is stored. Accordingly, all the image data having the same shooting date information as untransferred image data can be deleted from the HDD 180. In this regard, deletion of the image data may be performed by using a method in which information on the image data to be deleted is erased from the HDD 180 physically completely, or using a method in which the image data is erased logically in the HDD 180 by opening the address where the information on the image data to be deleted is stored, so that the address can be overwritten. Upon deleting all the image data having the same shooting date information as untransferred image data from the HDD 180, the controller 160 exits the transfer mode (S300).

Thus, the digital video camera 100 according to this embodiment is configured to terminate transfer when the remaining power level of the power source 260 falls below a particular level even if image data are transferred partway, and to delete, from the storage medium of the transfer destination, all or a part of the transferred image data among already transferred image data depending on the shooting date of the last transferred image data, in other words, the shooting date of untransferred image data. Due to this, when trying to transfer a plurality of image data having the same shooting date from the storage medium in which the image data is stored, even if the power level of the power source is drained completely in the course of transfer of the image data, so that transfer of image data is aborted partway, the situation can be prevented in which only a part of image data having the same shooting date is transferred to be stored in the storage medium of the transfer destination. Further, the situation also can be prevented in which only the management files are transferred to the transfer destination, and the associated image data are not transferred to the transfer destination.

2-2. Conclusion of Embodiment 2

The digital video camera 100 according to this embodiment includes a power source 260 that supplies power, and a controller 160. The controller 160 functions as: a transfer portion that reads out image data stored in the memory card 200 (or the HDD 180), and transfers the image data to the HDD 180 (or the memory card 200); an identification portion that identifies image data stored in the memory card 200 and image data stored in the HDD 180; a specification portion that, when transfer of image data by the transfer portion is terminated partway, determines the presence or absence of untransferred image data to the HDD 180 (or the memory card 200) that is the storage medium of the transfer destination among interrelated image data based on the identification result by the identification portion, and that, when the presence of untransferred image data is determined, specifies image data related to the untransferred image data among image data stored in the HDD 180 (or the memory card 200) that is the storage medium of the transfer destination; and a deletion portion that deletes the image data specified by the specification portion from the HDD 180 (or the memory card 200) that is the storage medium of the transfer destination. Further, the controller 160 functions as an termination instruction portion that instructs the transfer portion to terminate transfer of image data when the remaining power level of the power source 260 falls below a particular power level in the course of transfer of image data. Accordingly, the controller 160 terminates transfer of image data when the remaining power level of the power source 260 falls below a particular power level in the course of transfer of image data.

Due to this, even if the power level of the power source is drained completely so that transfer of image data is aborted partway, the situation can be prevented from occurring in which only a part of interrelated image data is transferred to be stored in the storage medium of the transfer destination.

Other Embodiments

Embodiments of the data transfer apparatus and the method of data transfer of the present invention have been described with reference to Embodiments 1 and 2 above. However, the data transfer apparatus and the data transfer method of the present invention are not limited thereto. Therefore, other embodiments of the data transfer apparatus and the data transfer method of the present invention are described collectively herein.

The digital video camera of Embodiment 1 and Embodiment 2 has a configuration in which image data are deleted from the storage medium of the transfer destination based on the shooting date information of the image data, after termination of image data transfer. However, the present invention is not necessarily limited to such a configuration. For example, it may have a configuration in which image data of a specific object can be transferred collectively by using a face authentication technique. A configuration also may be adopted in which, when transfer of image data is terminated partway, all image data of the same object as the object appearing in the last transferred image data are deleted from the storage medium of the transfer destination, being regarded as image data related to untransferred image data. This can prevent transfer of image data from being performed partway, when the image data are transferred in a unit of each object in which the camera person is most likely to be interested. Moreover, for example, it may be configured to be capable of transferring image data collectively in a unit of each object scene (night view, landscape, sunset etc.). In such a configuration, when transfer of image data is terminated partway, all image data classified into the same scene as the scene appearing in the last transferred image data are deleted from the storage medium of the transfer destination, being regarded as image data related to untransferred image data. This can prevent partial transfer of image data in which only a part of the image data classified into the same scene is stored in the storage medium of the transfer destination, in spite of the fact that the image data are transferred in a unit of each object scene of the image data. In this way, the data transfer apparatus of the present invention may delete, from the storage medium of the transfer destination, already transferred image data having a particular relationship with image data in the course of transfer (e.g. the shooting date, the object, and the scene of the image), when transfer of image data is terminated partway.

In Embodiment 1 and Embodiment 2, examples in which image data stored in the memory card 200 are transferred to the HDD 180 are described. However, it is needless to say that the present invention is not limited thereto, and a similar transfer control is possible also in the case of transferring image data from the HDD 180 to the memory card 200.

Further, the optical system and the drive system of the digital video camera 100 according to Embodiment 1 and Embodiment 2 are not limited to those indicated in FIG. 1. For example, although FIG. 1 exemplifies a three-component optical system, other components may constitute the lens configuration. Each lens may be constituted of one lens as well as a lens group constituted of a plurality of lenses.

Further, although the CCD image sensor 180 is exemplified as an image pickup portion in Embodiment 1 and Embodiment 2, the present invention is not limited thereto. For example, it may be constituted of a CMOS image sensor or an NMOS image sensor.

It should be noted that, in the digital video camera 100 according to this embodiment, when transfer of image data is terminated partway, whether or not to delete, from the HDD 180, image data already transferred from the memory card 200 to the HDD 180 is decided depending on whether or not the already transferred image data have the same shooting date as the untransferred image data. That is, an example is described in which shooting date information is used as identification information for deciding related data. However, such a configuration is not always necessary. For example, a configuration may be possible in which image data of the same object as the object appearing in image data in the course of transfer are deleted from the storage medium of the transfer destination using the object information as identification information. In addition, it may be configured to delete, from the storage medium of the transfer destination, image data of a scene which are recognized to be the same scene as the scene of image data in the course of transfer using the scene information as identification information.

Although a digital video camera is indicated as an example of the data transfer apparatus of the present invention in Embodiment 1 and Embodiment 2, the present invention is not limited thereto. The technique of the data transfer apparatus of the present invention may be adopted in imaging apparatuses other than digital video cameras. Moreover, it is also possible that the technique of the data transfer apparatus of the present invention is adopted in information recording-reproducing devices such as Blu-ray disc recorders, or information processing devices such as personal computers.

Even when the data transfer apparatus of the present invention is, for example, an information processing device such as a personal computer, the processing operation in the case of partway transfer termination can be the same as described in Embodiment 1 and Embodiment 2. For example, when image data stored in the HDD of a digital video camera (which corresponds to the first storage medium) are transferred to the HDD of a personal computer (which corresponds to the second storage medium), a configuration may be employed in which a CPU provided in the personal computer functions as: a transfer portion that reads out image data stored in the HDD of the digital video camera, and transfers the image data to the HDD of the personal computer; an identification portion that identifies image data in the course of transfer from the HDD of the digital video camera to the HDD of the personal computer, and image data stored in the HDD of the personal computer that is the storage medium of the transfer destination; a specification portion that, when transfer of image data is terminated partway, specifies image data related to the image data in the course of transfer that is terminated partway among image data stored in the HDD of the personal computer that is the storage medium of the transfer destination, based on the identification result by the identification portion; and a deletion portion that deletes the image data specified by the specification portion from the HDD of the personal computer that is the storage medium of the transfer destination.

Even when the data transfer apparatus of the present invention is, for example, an information recording-reproducing device, a configuration may be employed in which the controller of the information recording-reproducing device functions as a transfer portion, an identification portion, a specification portion, and a deletion portion, by the same token.

The data transfer apparatus and the data transfer method of the present invention can be adopted in imaging apparatuses such as digital video cameras and digital still cameras, information recording-reproducing devices such as Blu-ray disc recorders, and information processing devices such as personal computers.

Specific embodiments or examples in this "detailed description of the invention" are given to clarify the technique of the present invention, and they are not to limit the invention to such specific examples, nor are they to be interpreted in a narrow sense at any points. Variations and modifications of the present invention can be effected within the spirit and scope of the invention and the appended claims.

What is claimed is:

1. A data transfer apparatus comprising:
a transfer portion that reads out image data associated with identification information and stored in a first storage medium, and transfers the image data to a second storage medium;
an identification portion that identifies, by means of the identification information, image data associated with the identification information and stored in the first storage medium, and image data associated with the identification information and stored in the second storage medium;
a specification portion that, when transfer of image data by the transfer portion is terminated partway, determines the presence or absence of untransferred image data to the second storage medium among image data having the same identification information as each other, based on the identification result by the identification portion, and that, when the presence of untransferred image data is determined, specifies, as image data related to the untransferred image data, image data having the same identification information as the untransferred image data among the image data stored in the second storage medium; and
a deletion portion that deletes the image data specified by the specification portion from the second storage medium.

2. The data transfer apparatus according to claim 1, further comprising:

an identification information receiving portion that receives a user selection of identification information associated with image data to be transferred from the first storage medium to the second storage medium, wherein the transfer portion is capable of reading out, from the first storage medium, image data associated with the identification information that is received by the identification information receiving portion, and capable of transferring the image data to the second storage medium.

3. The data transfer apparatus according to claim 1, wherein the first storage medium and the second storage medium each classify and store image data based on the associated identification information.

4. The data transfer apparatus according to claim 1, wherein the identification information is shooting date information.

5. The data transfer apparatus according to claim 1, further comprising:

a transfer termination receiving portion that receives a user selection of termination of image data transfer, wherein the transfer portion terminates transfer of image data when the transfer termination receiving portion receives the selection of termination of image data transfer.

6. The data transfer apparatus according to claim 1, further comprising:

a power source that supplies power; and an termination instruction portion that instructs the transfer portion to terminate transfer of image data when the remaining power level of the power source falls below a particular power level in the course of transfer of image data by the transfer portion, wherein the transfer portion terminates transfer of image data when receiving an instruction of termination of image data transfer from the termination instruction portion.

7. A data transfer method for transferring image data stored in a first storage medium to a second storage medium, the method comprising the steps of:

in the case where transfer of image data is terminated in the course of reading out image data stored in the first storage medium and transferring it to the second storage medium, after determining the presence or absence of untransferred image data to the second storage medium among image data having the same identification information as each other, specifying, as image data related to the untransferred image data, image data having the same identification information as the untransferred image data among image data stored in the second storage medium when determining the presence of untransferred image data; and deleting the image data specified as image data having the same identification information as the untransferred image data from the second storage medium.

* * * * *